United States Patent [19]

Schmersal et al.

[11] 3,749,959

[45] July 31, 1973

[54] GAS DISCHARGE PANEL CONTAINING FLEXIBLE ELECTRICAL CONNECTIONS

[75] Inventors: Larry J. Schmersal; Gerald E. Wojcik, both of Toledo, Ohio

[73] Assignee: Owens-Illinois Inc., Toledo, Ohio

[22] Filed: Oct. 4, 1971

[21] Appl. No.: 186,402

Related U.S. Application Data

[60] Division of Ser. No. 102,025, Dec. 28, 1970, which is a continuation-in-part of Ser. No. 23,236, March 27, 1970, abandoned.

[52] U.S. Cl. ........... 313/188, 174/117 PC, 313/220, 313/318

[51] Int. Cl. .......................... H01j 5/58, H01j 61/36

[58] Field of Search .................... 313/108, 188, 220, 313/318; 315/169 R, 169 NV; 174/68.5, 117 PC

[56] References Cited

UNITED STATES PATENTS

| | | | |
|---|---|---|---|
| 3,499,167 | 3/1970 | Baker et al. | 313/188 X |
| 3,631,287 | 12/1971 | Hoehn | 313/220 X |
| 3,105,869 | 10/1963 | Branch et al. | 174/68.5 |
| 3,854,502 | 9/1958 | Richter | 174/117 PC |

*Primary Examiner*—Palmer C. Demeo
*Attorney*—Donald Keith Wedding et al.

[57] ABSTRACT

There is disclosed a multiple gaseous discharge display/memory panel having flexible electrical cable connectors integrated therewith. There is further disclosed various methods of simultaneously making individual electrical connection between pairs of closely spaced electrode conductors carried on individual panel substrates and electrical conductors carried on flexible cable substrates in which energy is applied to solder on the connecting terminal ends of the conductors so as to melt the solder and form a bond between the conductors respectively. In one particular embodiment, one of the pairs of conductors is on a flat support plate as in a gas discharge display panel and the energy is directed through the glass substrate where it is absorbed by the conductors (on the panel substrate) to generate heat sufficient to melt the solder and form the bond. Typical solder energy sources include not by way of limitation thermal, infrared, ultrasonic, electrical, magnetic, etc. Consult the specification for further features and details.

1 Claim, 5 Drawing Figures

GAS DISCHARGE PANEL CONTAINING FLEXIBLE ELECTRICAL CONNECTIONS

RELATED APPLICATIONS

This is a division of copending U.S. patent application Ser. No. 102,025, filed Dec. 28, 1970, which is a continuation-in-part of copending U.S. patent application Ser. No. 23,236, filed Mar. 27, 1970, and now abandoned.

THE INVENTION

This invention relates to a multiple gaseous discharge display/memory device having flexible electrical connections integrated therewith including methods for making multiple electrical connections between pairs of pluralities of conductors simultaneously.

U.S. Letters Patent No. 3,499,167 issued to Baker et al. on Mar. 3, 1970, discloses a gas discharge display/memory device in which a pair of rectangular glass plate members (substrates) are joined in spaced apart relation and dielectrically coated multiple conductor arrays on the plate members, the conductor arrays being linear conductor arrays extending parallel to the long directions of the plates, respectively. The plates are joined with their long axes transverse to each other with the conductor ends extending beyond the points where the plates are spacedly joined toward at least one edge of the plate, respectively. This invention is concerned with the attachment of planar multiconductor flexible cables to such panels.

In accordance with this invention, a planar non-conductive flexible cable substrate having multiple electrical conductors thereon spaced apart a distance corresponding to the spacing between the extended electrode conductors of the gaseous discharge panel plates (or substrates), is integrated with the panel by soldering the individual conductor leads on the cable substrate to the electrode leads extending out from the gaseous discharge device. In a preferred embodiment, the terminal ends of the linear electrode conductors on the discharge device and/or the terminal ends of the conductors on flexible cable substrate have solder thereon. The solder carrying terminal ends of the closely spaced conductors are then placed in contact with the conductors on the other substrate and then, simultaneously, all contacts are solder bonded by reflowing the solder. More specifically, in a preferred embodiment, the solder at each contact is simultaneously reflowed or melted to a bonding temperature by generating heat in situ via the appropriate application of emergy, for example, by infrared, inductive thermal heating, friction heating, etc., including combinations thereof so as to achieve as great a degree of uniformity in the resulting electrical connection as is possible. While various methods of bonding the conductors by generating heat in situ are disclosed and claimed herein, it will be appreciated that the solder may be reflow melted by means of conduction heating.

BRIEF DESCRIPTION OF THE DRAWINGS:

The above and other advantages, features and objects of the invention will become apparent from the following specification taken in conjunction with the accompanying drawings wherein.

Figure 1:
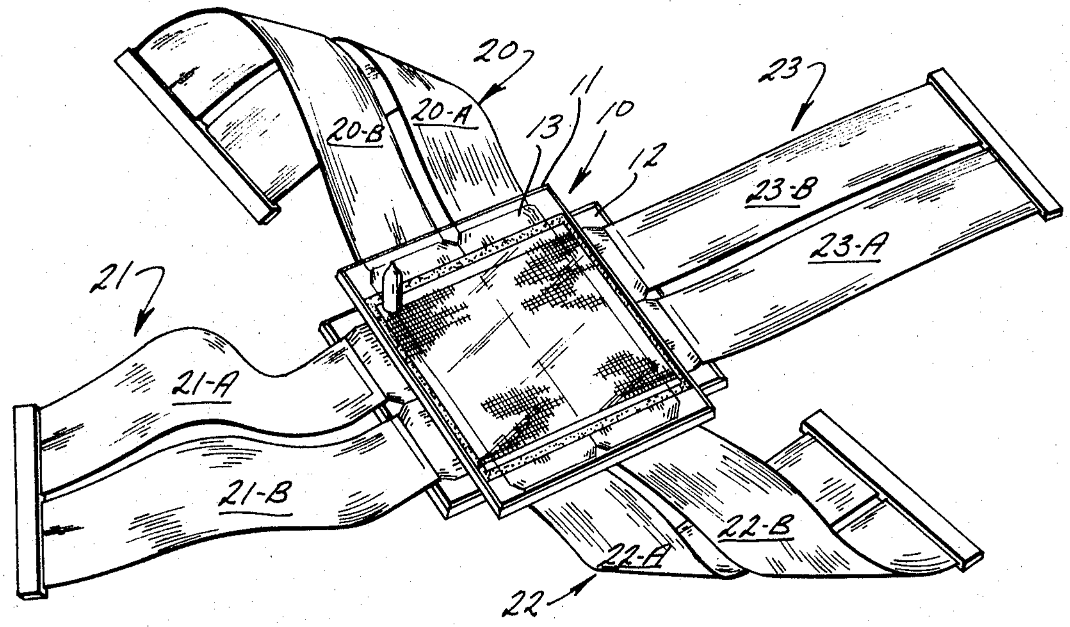
FIG. 1 is an isometric view of a gas discharge panel having flexible multiconductor cabling integrated therewith in accordance with the invention, FIG. 1A discloses a portion of display panel with the flexible multiconductor cables attached, FIG. 2 discloses one method of joining the flexible multiconductor cable to the display panel in accordance with an embodiment of the invention, FIG. 3 discloses a modified method of solder bonding the flexible multiconductor cable to the panel in accordance with a further embodiment of the invention, and FIG. 4 discloses the use of inductive heating of the solder in situ to effect the bond of the cable to the panel.

DETAILED DESCRIPTION OF THE INVENTION:

Referring now to FIG. 1, there is disclosed a gas discharge panel 10, preferably of the type disclosed in Baker et al. U.S. Pat. No. 3,499,167. Gas discharge panel 10 is constituted by a pair of elongated rectangular glass plates or substrates 11 and 12 having linear electrode conductor arrays 13 and 14, respectively, on opposing surfaces thereof and thin dielectric films or coatings 15 and 16 (FIG. 1A) over the conductor arrays 13 and 14, respectively. An endless sealant-spacer member 17 spacedly joins the two plate members with the long axes, respectively, of the plate numbers being at 90° to each other with both ends of the plates 11 and 12 being extended beyond the seal. The seal 17 forms with the opposing surfaces of dielectric coating 15 and 16, respectively, the bounding walls of a thin gas discharge chamber in which is confined a gaseous discharge medium.

Both of plate members 11 and 12 are constituted by relatively rigid commercially available polished plate glass and the conductors in arrays 13 and 14 are usually gold (but not limited thereto) and are printed on the plate members by a silk screening process, photoetching or other processes for printing conductors or conductor arrays. It will be apparent that the conductors may be wires.

In the panel 10, as shown, conductor arrays 13 and 14 are printed on 30 mil (1 mil equals 0.001 inch) centers with the conductors being about 6 mils wide. However, much closer conductor spacing and thinner conductor lines are well within the scope of this invention.

Because of the close spacing between the conductors of the arrays, it is difficult to make electrical connection to the ends of same without interfering with or making inadvertent electrical connections to adjacent conductors. In U.S. Pat. No. 3,631,287 issued to Harold J. Hoehn and entitled Gas Discharge Display/Memory Panel, alternate conductors in conductor array 13 are extended toward one end of the plate 11 and alternate adjacent conductors in the array are extended to the other end of the plate. The identical conductor arrangement scheme is applied to conductor array 14 on plate 12, and in fact, except for gas filling tubulation 40 on plate 11, plate 12 is identical to plate 11. This conductor arrangement is disclosed and claimed in the above-referenced Hoehn patent application and need not be described in greater detail herein. As illustrated in the drawing, plate 11 has a gas filling tubulation 40 which is applied to the manner described in the above-referenced Hoehn application.

The ends 14*e*-L and 14*e*-R of conductor array 14 are shown as being widened to form better bonding contact. The ends of conductor array 13 are likewise slightly enlarged, the lower end 13*e-b* being shown in FIG. 1A. It will be appreciated that the angulation shown at the ends of the conductors in arrays 13 and 14 may be eliminated. It is likewise apparent that instead of extending the conductors to both lateral ends of the plates, the conductors may extend to one side and the connection to be described later herein may be made with equal facility.

As shown in FIG. 1, a plurality of flexible cables 20, 21, 22, and 23 have been solder bonded or reflowed to the extended terminal ends of conductor arrays 13 and 14, respectively. Flexible multiconductor cables are well known in the art and the varities thereof, construction, materials, etc., are described in detail in the article entitled, "Flexible Printed Wiring" by G. T. Viglione appearing at pages 58, 59, and 60 of Electronics World, October, 1969, and an article entitled, "Wire (Multiconductor)" appearing in the Encyclopedia of Electronics by Susskind, (1962) at pages 936 and 937. However, the invention is not limited to the kinds of flexible conductor cables disclosed in these articles except to the extent that the materials chosen as the substrate material should, in a preferred embodiment of this invention, be transparent to infrared and that the conductor materials used should be infrared absorptive. Instead of having an insulating coating or layer on the conductor in the multiconductor cables 20–23, as is illustrated in the above-mentioned articles, the conductors may simply be printed conductors on a mylar film or other nonconductive substrate. Each of the flexible conductor cables 20–23 is shown as having rigidifying strip at the non-gas discharge terminal end thereof on the nonconductor side of the flexible cable. Such rigidifying strip may be continuous or discontinuous. It is within the further contemplation of this invention that instead of terminating the ends of the conductors at the terminal ends of flexible conductor cables 20–23 in the manner illustrated, e.g. with a rigidifying strip member, the conductors on the flexible cable substrate may, in fact, terminate in the form of printed secondary windings integrally connected to the conductors on the substrate which are fashioned into transformers for supplying operating potentials thereto.

Moreover, it is also within the contemplation of this invention to use the flat flexible cables as a substrate for holding solid state circuit chips for direct attachment or in some other hybrid configuration.

Figure 1A:
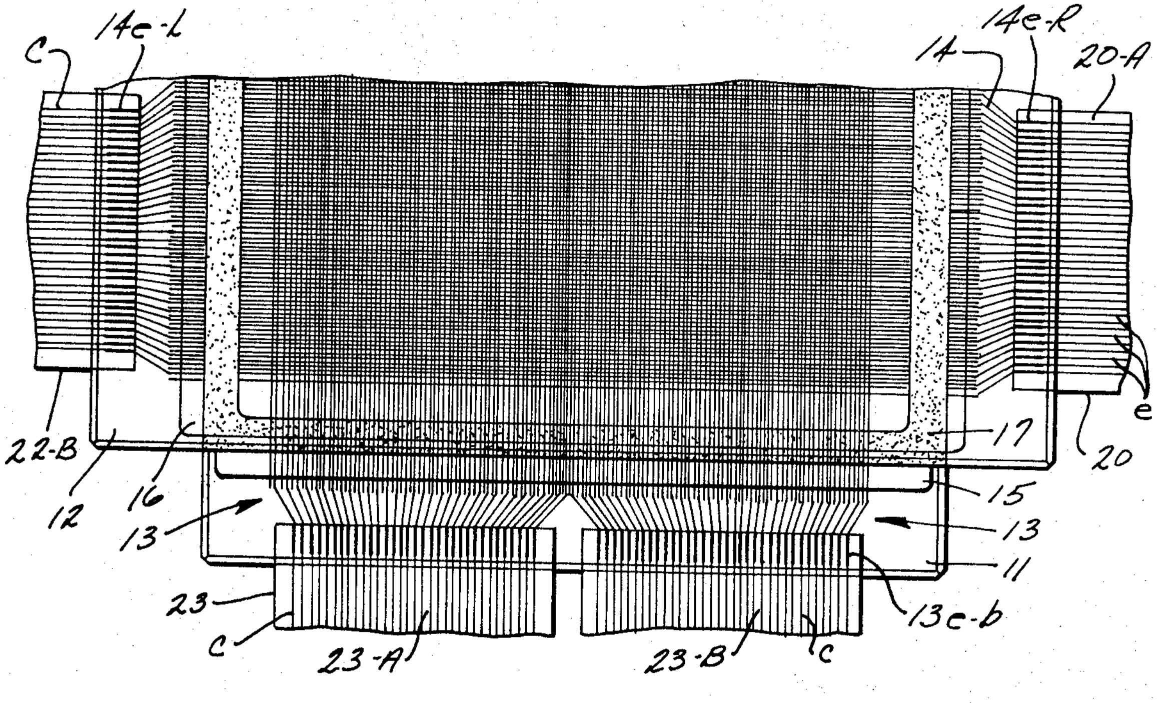

In FIGS. 1 and 1A, while the flexible conductor cable 20–23 are shown as pairs A and B, it will be appreciated that all the conductors may be carried on a single substrate or that there may be more than two substrates for carrying groups of conductors.

Figure 2:
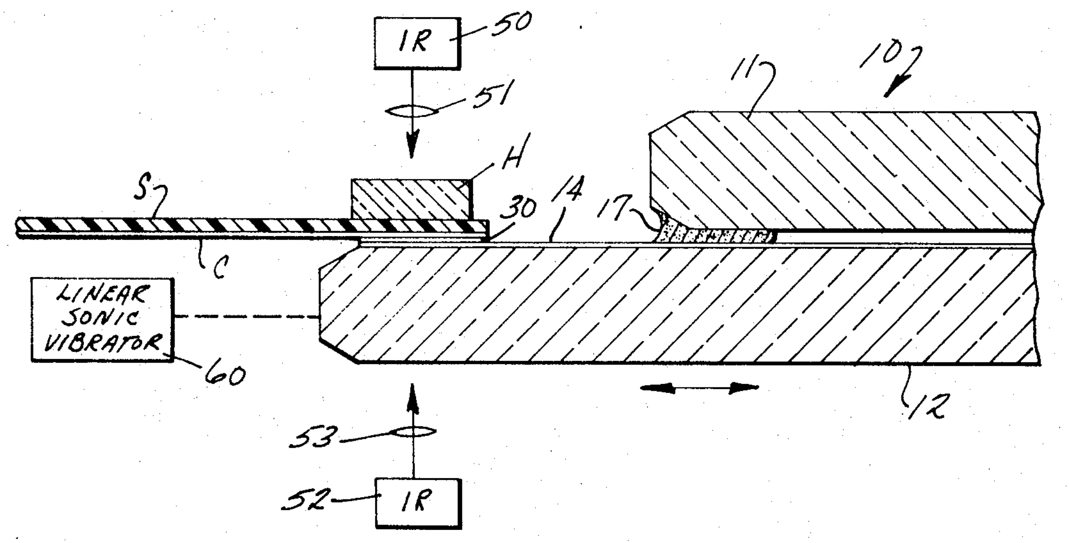
Figure 3:
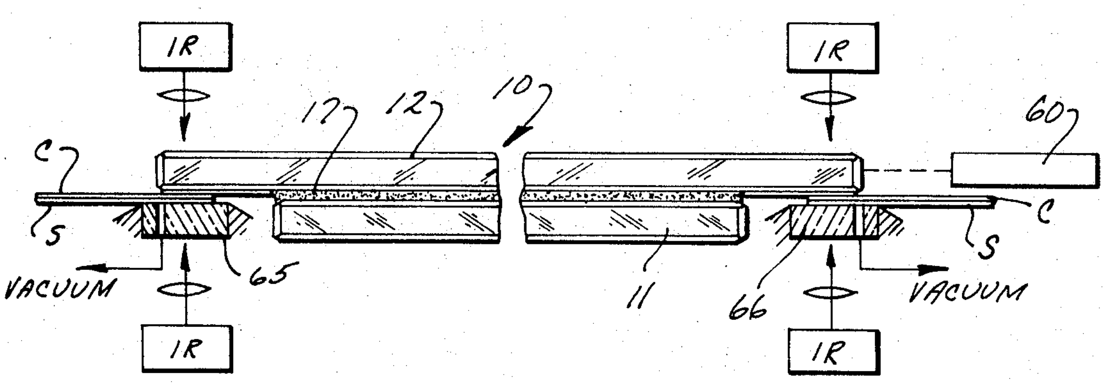
Figure 4:
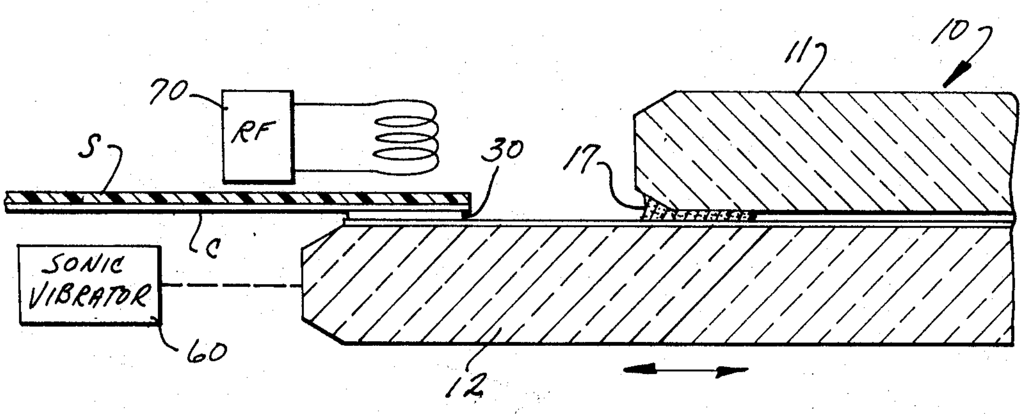

Referring now to FIGS. 2–4, various methods of forming or securing the terminal ends of the conductors on the flexible cable 20–23 are shown. In each case, it will be assumed that the ends of either or both conductors on the panel 10 and flexible substrate have been coated with a small bead or layer of solder 30. In these figures, the flexible conductor substrate is identified by the letter S, the conductors thereon by the letter C.

As shown in FIG. 2, the discharge panel 10 may be supported upon a flat table or other support device (not shown) and if the solder bead 30 is on the terminal ends of the conductors C of flexible substrate S, these solder carrying terminal ends are placed in contact with the terminal ends of the closely spaced conductors on plate 12. A transparent weight or holddown member H is placed on the nonconductor side of substrate S.

Hold down member H is transparent to infrared energy from IR source 50 (which may be an infrared laser). A lens element 51 may be used to focus the infrared energy on the conductors C to thereby convert the infrared energy to heat and, in turn, heat the solder 30 to a reflow temperature. Infrared energy may also be directed through plate 12 from IR source 52 and lens 53 to conductors 14 on plate 12 to convert this infrared energy to heat. Either one or both IR sources may be used and if both are used, they are applied simultaneously.

Alternatively, or simultaneously with the application of infrared energy, the panel 10 may be sonically vibrated by a linear sonic vibrator 60. Sufficient heat can be frictionally generated to achieve a uniform bond and electrical connection between each individual conductor C on substrate S and in conductor array 14, it being noted that panel plate 12 is vibrated or linearly oscillated in a direction parallel to the plane thereof and the longitudinal axis of the conductors. When the prime heat energy source is infrared, this sonic vibration will aid in achieving a uniform bond at all points of contact. Because of the flexible character of substrate S, it is preferred to vibrate the rigis panel 10. However, it will be appreciated that if substrate S is not flexible, it may be desirable to oscillate both substrates in the directions described above, but in out of phase relationships.

Where the glass substrate 12 of FIG. 2 is not completely transparent to the infrared energy and/or where the conductor arrays 13, 14 are of an infrared reflective material, e.g. gold, the IR source 52 may be undesirable and therefore can be deleted with exclusive reliance upon IR source 50. This is also true of the embodiment of FIG. 3 hereinafter.

In FIG. 3 substrates S are supported on and held in place by a pair of vacuum chucks 65 and 66, and the solder reflow techniques described above are applied in essentially the same way. It will be noted that all connections to one plate of the panel may be formed simultaneously in this arrangement, the panel 10 is then turned over so the plate 12 occupies the position shown for plate 11 and the operation repeated to integrate flexible cables to plate 11.

In FIG. 4, in situ heat is generated by applying an RF induction heating field from source 70 to solder beads 30, which in this embodiment is preferably a solder having a high permeability so as to efficiently convert the magnetic energy to heat. It will be appreciated that infrared and frictional energy may be directed into the assembly in the manner shown in FIGS. 3 or 4 and simultaneously induction heat, infrared heat and friction heat the solder to a reflow temperature very quickly to achieve the desired uniformity and high quality bond. A holddown device, such as the hold-down H of FIG. 2, will be used in practicing the method shown in FIG. 4.

Although the integrated gas discharge panel and flexible multiconductor cable assembly is preferably made in accordance with the methods disclosed herein, the assembly itself can be made by other methods, as for example, by resistance heaters and the like conduction heating of the solder to reflow temperature, with or without the sonic vibration. However, in this case, greater care must be exercised to the selection of substrate material S to prevent delamination of the conductors and/or scorching of the substrate material.

We claim:

1. In a gas discharge panel having a pair of elongated flat glass plates spacedly joined to form a thin gas discharge chamber with linear conductor arrays laminated to a flat surface thereof extending parallel to the long directions of said plates respectively, and with said plates having their long axes transverse to each other, said conductors extending beyond where said plates are spacedly joined and toward at least one edge of said plates, respectively, the improvement in the means for connecting and conductor arrays to a source of operating potential comprising, a flexible nonconductive substrate having multiple conductors thereon spaced apart a distance corresponding to the spacing between the terminal ends of said extended conductors, solder means between the extended conductor ends and the conductors on said flexible planar nonconductive substrate and forming an electrically conductive solder bond therebetween, said electrically conductive solder bond for each conductor having been simultaneously formed in situ and integrating said flexible substrate and conductors thereon to said panel whereby said solder bond for all conductors carried by each said flexible nonconductive substrate are of highly uniform character.

* * * * *